United States Patent
Hunter et al.

(10) Patent No.: US 10,780,983 B2
(45) Date of Patent: Sep. 22, 2020

(54) SEWN ALTERNATE INFLATE PNEUMATIC DE-ICER

(71) Applicant: Goodrich Corporation, Charlotte, NC (US)

(72) Inventors: James R. Hunter, Union, WV (US); Galdemir Cezar Botura, Akron, OH (US); Samual Steven Riczo Schomer, Akron, OH (US); Alan J. Fahrner, Canton, OH (US); Kurt M. Tauscher, Kent, OH (US)

(73) Assignee: Goodrich Corporation, Charlotte, NC (US)

( * ) Notice: Subject to any disclaimer, the term of this patent is extended or adjusted under 35 U.S.C. 154(b) by 410 days.

(21) Appl. No.: 15/845,428

(22) Filed: Dec. 18, 2017

(65) Prior Publication Data
US 2019/0185168 A1    Jun. 20, 2019

(51) Int. Cl.
*B64D 15/16*    (2006.01)
*B32B 7/08*    (2019.01)

(52) U.S. Cl.
CPC .............. *B64D 15/166* (2013.01); *B32B 7/08* (2013.01); *B32B 2250/02* (2013.01); *B32B 2605/18* (2013.01)

(58) Field of Classification Search
CPC .............................. B64D 15/166; B64D 15/16
USPC ...................................................... 244/134 A
See application file for complete search history.

(56) References Cited

U.S. PATENT DOCUMENTS

| | | | |
|---|---|---|---|
| 3,690,601 A * | 9/1972 | Roemke | B64D 15/166 244/134 A |
| 4,463,919 A * | 8/1984 | Bac | B64D 15/16 244/134 A |
| 4,508,295 A * | 4/1985 | Cattaneo | B64D 15/16 244/134 A |
| 4,516,745 A | 5/1985 | Ely et al. | |
| 4,613,102 A * | 9/1986 | Kageorge | B64D 15/166 244/134 A |
| 4,747,575 A | 5/1988 | Putt et al. | |
| 4,826,108 A | 5/1989 | Briscoe et al. | |
| 5,112,011 A | 5/1992 | Weisend, Jr. et al. | |

(Continued)

FOREIGN PATENT DOCUMENTS

| | | | | |
|---|---|---|---|---|
| CA | 2912107 A1 * | 7/2016 | .......... | B64D 15/166 |
| CA | 2984530 A1 * | 6/2018 | .......... | B29C 66/729 |

(Continued)

OTHER PUBLICATIONS

Extended European Search Report for EP Application No. 18212240.8, dated Apr. 8, 2019, 10 pages.

(Continued)

*Primary Examiner* — Christopher P Ellis
(74) *Attorney, Agent, or Firm* — Kinney & Lange, P.A.

(57) ABSTRACT

A de-icing assembly for a surface of an aircraft includes a carcass with a first layer and a second layer, a plurality of seams sewn into the carcass, and a bonded region. The plurality of seams join the first and second layers of the carcass together. Each of the plurality of seams comprises two or more stitchlines. The bonded region is disposed between the two or more stitchlines and seals a portion of the first layer of the carcass to a portion of the second layer of the carcass.

18 Claims, 4 Drawing Sheets

(56) References Cited

U.S. PATENT DOCUMENTS

| | | | | |
|---|---|---|---|---|
| 5,164,242 | A | * | 11/1992 | Webster ................ B64D 15/16 156/60 |
| 5,310,142 | A | * | 5/1994 | Weisend, Jr. ........ B64D 15/166 244/134 A |
| 5,337,978 | A | * | 8/1994 | Fahrner ................ B64D 15/166 244/134 A |
| 5,558,304 | A | * | 9/1996 | Adams .................. B64D 15/00 244/134 A |
| 5,782,435 | A | * | 7/1998 | Ingram ................ B64D 15/163 244/134 A |
| 6,247,669 | B1 | | 6/2001 | Rauckhorst, III et al. |
| 6,520,452 | B1 | * | 2/2003 | Crist ...................... B64D 15/16 244/134 A |
| 9,100,994 | B2 | | 8/2015 | Orawetz et al. |
| 2002/0066827 | A1 | * | 6/2002 | Hyde ........................ B64C 1/36 244/134 R |
| 2003/0122037 | A1 | * | 7/2003 | Hyde .................. B64D 15/166 244/134 A |
| 2018/0362167 | A1 | * | 12/2018 | Schomer ............. B64D 15/166 |

FOREIGN PATENT DOCUMENTS

| | | | | |
|---|---|---|---|---|
| DE | 1059772 | B | | 6/1959 |
| EP | 173162 | A1 * | 8/1985 | ............. B64D 15/18 |
| EP | 0173162 | A1 * | 3/1986 | ........... B64D 15/166 |
| EP | 0658478 | A1 | | 7/1994 |
| EP | 3392147 | A1 * | 10/2018 | ........... B64D 15/166 |
| EP | 3428067 | A1 * | 1/2019 | ................ F02C 7/04 |
| EP | 3511384 | A1 * | 7/2019 | ................ C09J 5/02 |
| GB | 518180 | A * | 2/1940 | ........... B64D 15/166 |
| WO | WO-0242150 | A1 * | 5/2002 | ............. B64D 33/02 |
| WO | WO2017/194600 | A1 | | 11/2017 |

OTHER PUBLICATIONS

Communication Pursuant to Article 94(3) EPC for EP Application No. 18212240.8, dated Apr. 22, 2020, 11 pages.

* cited by examiner

SEWN ALTERNATE INFLATE PNEUMATIC DE-ICER

BACKGROUND

The present invention relates generally to ice protection systems, and more specifically to pneumatic de-icing systems for aircraft.

During operation, aircraft face an undesirable risk of ice accretion on forward facing components such as the leading edge of wings, horizontal stabilizers, or other airfoils. Ice that forms on airfoil components can cause drag, loss of lift, and added weight. In order to avoid such problems, it is desired to provide an ice protection system that reduces ice formation on airfoil surfaces while also maintaining relatively low power expenditures by the ice protection system. One such ice protection system is a pneumatic de-icer.

Existing pneumatic de-icers (sometimes called de-icer boots) employ inflation tubes or passages created between an inner layer and an outer layer of the de-icer. The inflation tubes inflate causing portions of the outer layers to move away from the aircraft structure. This movement deforms the outer layer so that ice that has accumulated on the outer layer cracks and is shed from the outer layer.

Pneumatic de-icers on airfoil leading edges of some aircraft are subjected to a high utilization (e.g., inflation/deflation cycle) rate due to system operational designs of multiple inflations per de-icing cycle, as well as increased system utilization mandated for aircraft by aviation authorities due to severe icing events. This increased utilization of the pneumatic ice protection system results in increased fatigue of the de-icers.

SUMMARY

A de-icing assembly for a surface of an aircraft includes a carcass with a first layer and a second layer, a plurality of seams sewn into the carcass, and a bonded region. The plurality of seams join the first and second layers of the carcass together. Each of the plurality of seams comprises two or more stitchlines. The bonded region is disposed between the two or more stitchlines and seals a portion of the first layer of the carcass to a portion of the second layer of the carcass.

A pneumatic de-icing assembly for an aircraft includes an array of pneumatically inflatable pockets and a seam between adjacent pockets. The array of pneumatically inflatable pockets are arranged in a side-by-side configuration. The seam includes a set of parallel stitchlines and a bond extending parallel to and positioned between the stitchlines. The seam separates and seals between the adjacent pockets so that the adjacent pockets are separably inflatable and deflatable.

A method of making a de-icer includes bringing together a first layer of a carcass and a second layer of the carcass such that a first rubber coating on the first layer faces a second rubber coating on the second layer. A plurality of seams, each with two or more stitchlines, are sewn into the carcass. The first layer is bonded to the second layer such that a bond is formed between the two or more stitchlines.

DETAILED DESCRIPTION

Existing pneumatic de-icers employ inflation tubes created between an inner layer and an outer layer of the de-icer, the movement of which deforms the outer layer so that ice accumulated on the outer layer cracks and is shed from the outer layer. The de-icers are created with individual tubes laid side by side creating tube boarders between the tubes to provide the pattern of individual tubes. These individual tube de-icers can have groups of tubes inflated at separate times, such as alternating or every other tube. Other existing pneumatic de-icers utilize a sewn carcass consisting of a non-stretch and a stretch fabric, wherein an inflatable pattern consists of stitchlines instead of tube borders. However, these stitch lines do not isolate the inflatable sections from one another and they are not conventionally capable of alternate tube inflation. Methods to separate sewn tubes are used in clamshell de-icers, but require additional manual labor and non-inflatable areas to supplement the otherwise air permeable center stitch line resulting in two inflatable areas. The non-inflatable separating area on clamshell de-icers is also much wider than those proposed in this invention. The additional cost and resulting geometry of the sealed area on a clamshell de-icer is unreasonable to use between all tubes to achieve alternate inflation patterns.

Figure 1:
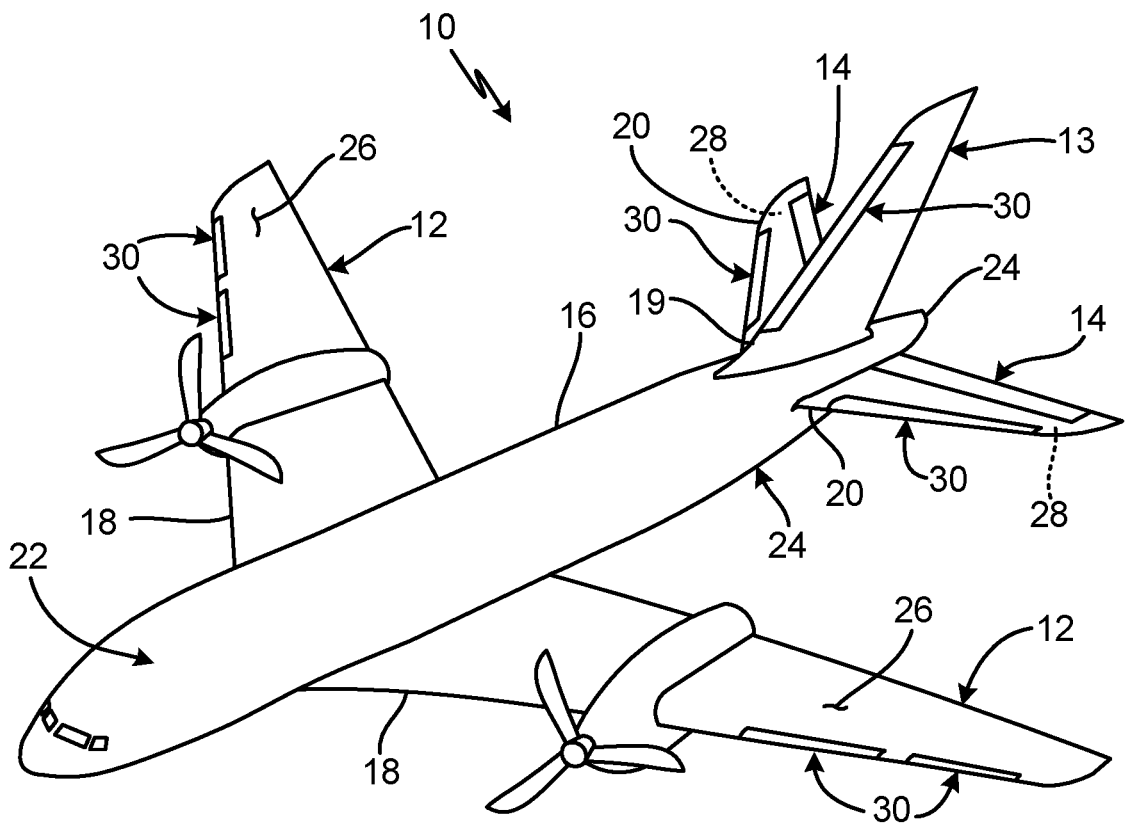
FIG. 1 is a perspective view of an aircraft with a pneumatic de-icing assembly.

FIG. 1 is a perspective view of aircraft 10 including wings 12, vertical stabilizer 13, horizontal stabilizers 14, fuselage 16, leading edges 18 of wings 12, leading edge 19 of vertical stabilizer 13, leading edges 20 of horizontal stabilizers 14, nose section 22, tail section 24, upper surfaces 26 of wings 12, lower surfaces 28 of horizontal stabilizers 14, and de-icers 30. In the illustrated configuration of FIG. 1, aircraft 10 is of a fixed-wing design. Fuselage 16 extends from nose section 22 to tail section 24, with wings 12 fixed to fuselage 16 between nose section 22 and tail section 24. Vertical stabilizer 13 is attached to fuselage 16 on tail section 24. Horizontal stabilizers 14 are attached to fuselage 16 on tail section 24. Vertical stabilizer 13 functions to control the yaw of aircraft 10. Wings 12 and horizontal stabilizers 14 function to create lift and to control the pitch, respectively, for aircraft 10. Wings 12 and horizontal stabilizers 14 include critical suction surfaces, such as upper surfaces 26 of wings 12 and lower surfaces 28 of horizontal stabilizers 14, where flow separation and loss of lift can occur if ice collects on any of the forward facing surfaces of wings 12 such as leading edges 18 and of horizontal stabilizers 14 such as leading edges 20. FIG. 1 also shows de-icers 30 mounted onto leading edges 18 of wings 12 and onto leading edges 20 of horizontal stabilizers 14. De-icers 30 protect against formation of ice along leading edge 18 of wing 12. In other non-limiting embodiments, de-icers 30 can be mounted onto any leading edge or non-leading edge surface of aircraft 10, such as leading edge 19 of vertical stabilizer 13. In this non-limiting embodiment, de-icers 30 are sewn pneumatic de-icers that function by filling with air to deform an outward surface of de-icers 30 so as to break apart ice and break the adhesion of the ice to de-icers 30.

Figure 2A:
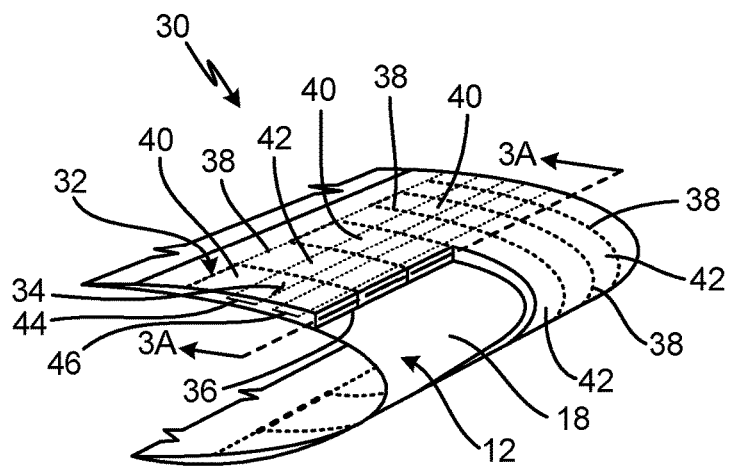
FIG. 2A is a perspective cut-away view of a pneumatic de-icer with deflated inflatable pockets which is attached to a leading edge of a wing of the aircraft.

FIG. 2A is a perspective cut-away view of de-icer 30 which is attached to leading edge 18 of wing 12 of aircraft 10. De-icer 30 is shown in a deflated state and includes carcass 32 (with first layer 34 and second layer 36), seams 38, first set of inflatable pockets 40, second set of inflatable pockets 42, first manifold 44, and second manifold 46.

De-icer 30 is a sewn, pneumatic de-icer. In this non-limiting embodiment, de-icer 30 is a chord-wise de-icer which is oriented such that first and second sets of inflations passages 40 and 42 are oriented lengthwise relative to the chord-wise direction of wing 12. An example of a sewn pneumatic de-icer is described in U.S. Pat. No. 4,516,745 to Ely et al. entitled "Pneumatic Deicer and Deicing Method" and issued May 14, 1985.

Carcass 32 is a flexible, layered article configured to retain a volume of pressurized gas. Carcass 32 provides the structural framework of de-icer 30. First layer 34 and second layer 36 are layers of fabric. In some non-limiting embodiments, first layer 34 and second layer 36 can include coatings such as rubber or elastomer. In this non-limiting example, first layer 34 includes a stretch (e.g., elastic) fabric while second layer 36 includes a non-stretch (e.g., non-elastic) fabric.

Seams 38 define regions between adjacent inflation pockets (or passages) along which layers of carcass 32 are joined and/or attached together. In one non-limiting embodiment, any of seams 38 can include one or more stitchlines. First set of inflatable pockets 40 and second set of inflatable pockets 42 are inflatable channels, passages, or pockets (these three terms can be used interchangeably) and form an array of pneumatically inflatable pockets. First manifold 44 and second manifold 46 are conduits for the transmission of a fluid such as a gas.

De-icer 30 with carcass 32 is mounted onto leading edge 18 of wing 12 of aircraft 10. In other non-limiting embodiments, de-icer can be mounted onto any leading edge or non-leading edge surface of aircraft 10. In this non-limiting embodiment, de-icer is mounted onto wing 12 such that first set of inflatable pockets 40 and second set of inflatable pockets 42 are oriented lengthwise in a chord-wise direction of wing 12. In other non-limiting embodiments (see e.g., FIGS. 4A and 4B), de-icer 30 can be configured such that first set of inflatable pockets 40 and second set of inflatable pockets 42 are oriented lengthwise in a span-wise direction of wing 12.

First layer 34 and second layer 36 are attached to each other with seams 38. Seams 38 are sewn into carcass 32 and attach or affix first layer 34 and second layer 36 to each other. As will be discussed in further details with respect to FIGS. 3B-3C, each of seams 38 include a bonded region located between the two or more stitchlines of each of seams 38.

First set of inflatable pockets 40 and second set of inflatable pockets 42 are disposed between first layer 34 and second layer 36. First set of inflatable pockets 40 and second set of inflatable pockets 42 are formed by seams 38. In this non-limiting embodiment, first set of inflatable pockets 40 are not fluidly connected to second set of inflatable pockets 42 such that first set of inflatable pockets 40 and second set of inflatable pockets 42 are separately inflatable from each other. First manifold 44 is fluidly connected to first set of inflatable pockets 40. Second manifold 46 is fluidly connected to second set of inflatable pockets 42. In one non-limiting embodiment, first manifold 44 and second manifold 46 are generally oriented perpendicular relative to and pass underneath first and second sets of inflatable pockets 40 and 42.

Pneumatic de-icing systems and functioning thereof are described in U.S. Pat. No. 6,520,452 to Crist et al. entitled "Deicer for Aircraft" issued Feb. 18, 2003 and in U.S. Pat. No. 5,337,978 to Fahrner et al. entitled "Leading Edge Pneumatic De-icer Assembly" issued Aug. 16, 1994, both of which are incorporated herein by reference in their entireties.

During operation of aircraft 10 in icing conditions, first and second sets of inflatable pockets 40 and 42 of de-icer 30 are independently inflated and deflated during de-icing cycles of de-icer 30. Carcass 32 functions by containing an amount of gas to control the degree of inflation of first and second sets of inflatable pockets 40 and 42. First layer 34 and second layer 36 form planar boundaries between which a gas is disposed to inflate first and second sets of inflatable pockets 40 and 42. As either of first and second sets of inflatable pockets 40 and 42 are inflated, portions of second layer 36 bulge or swell outward from wing 12 so as to break apart and debond ice formed on an outer surface of de-icer 30 causing the ice to be removed from de-icer 30.

Seams 38 attach or affix first layer 34 and second layer 36 to each other. During inflation/deflation cycles of de-icer 30, seams 38 also function to maintain the shape of first and second sets of inflatable pockets 40 and 42 between first layer 34 and second layer 36 of carcass 32. The bonded region between the two or more stitchlines of each of seams 38 bonds a portion of first layer 34 of carcass 32 to a portion of second layer 36 of carcass 32 to form a fluidic seal such that fluid communication across seams 38 is prevented.

First set of inflatable pockets 40 and second set of inflatable pockets 42 function by receiving amounts of pressurized gas during inflation/deflation cycles of de-icer 30 from first and second manifolds 44 and 46, respectfully. In one non-limiting embodiment, first set of inflatable pockets 40 and second set of inflatable pockets 42 can be inflated and/or deflated at the same or different rates, times, volumes of gas, and/or pressures. In a non-limiting embodiment, first set of inflatable pockets 40 is inflated with gas from first manifold 44. During inflation of first set of inflatable pockets 40, second set of inflatable pockets 42 remains deflated. First set of inflatable pockets 40 is then deflated by removing or drawing the gas from first set of inflatable pockets 40. Either during or after the gas is removed from first set of inflatable pockets 40, second set of inflatable pockets 42 is inflated with gas from second manifold 46. First manifold 44 provides a gas to first set of inflatable pockets 40 so as to inflate and deflate first set of inflatable pockets 40. Second manifold 46 provides a gas to second set of inflatable pockets 42 so as to inflate and deflate second set of inflatable pockets 42.

During operation of existing sewn de-icers in icing conditions, the inflatable pockets are all subjected to inflation and deflation during de-icing cycles of the de-icer. In existing sewn de-icers without sets of inflatable pockets disconnected from each other, the stitchlines do not isolate the inflatable passages from one another and are not conventionally capable of alternate tube inflation. Other existing pneumatic de-icers with alternate inflating tubes can be utilized to minimize the turbulence induced by the tube shapes. However, these tube de-icers are built with an internal bladder consisting of a series of tubes laid next to one another and attached to two separate internal manifolds, construction of which is cumbersome and heavy. De-icer 30 with first and second sets of inflatable pockets 40 and 42 allows for the creation of a sewn pneumatic de-icer with stitchlines capable of isolating the inflatable areas (e.g., first and second sets of inflatable pockets 40 and 42) adjacent to one another.

Figure 2B:
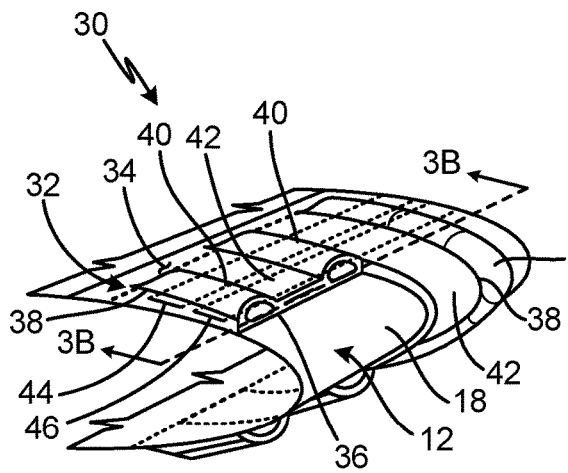
FIG. 2B is a perspective cut-away view of the pneumatic de-icer with a first set of inflatable pockets inflated and a second set of inflatable pockets deflated.
Figure 2C:
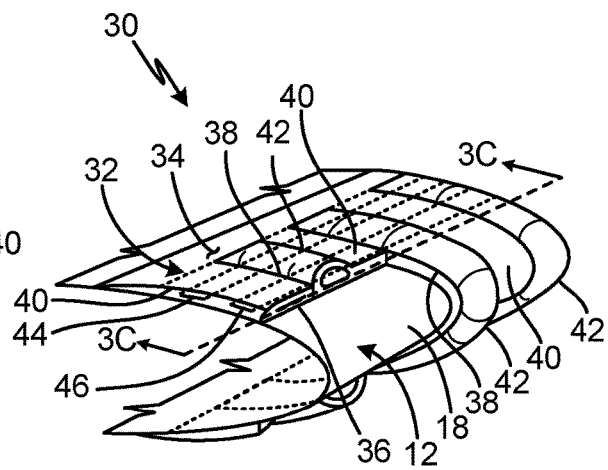
FIG. 2C is a perspective cut-away view of the pneumatic de-icer with the first set of inflatable pockets deflated and the second set of inflatable pockets inflated.

FIG. 2B is a perspective cut-away view of de-icer 30 with first set of inflatable pockets 40 as inflated and second set of inflatable pockets 42 as deflated. FIG. 2C is a perspective cut-away view of the pneumatic de-icer with first set of inflatable pockets 40 deflated and second set of inflatable pockets 42 inflated.

When inflated, first and second sets of inflation passages 40 and 42 distend to form a generally elongated tubular shape. As either of first and second sets of inflations passages 40 and 42 inflates, an outer surface of first layer 34 bulges outward causing ice formed on de-icer to disband and break apart and be removed from first layer 34.

As is shown in FIGS. 2B and 2C, first set of inflatable pockets 40 are fluidly isolated from second set of inflatable pockets 42 such that first set of inflatable pockets 40 and second set of inflatable pockets 42 each include their own separate fluidic chambers. This allows the inflation of first set of inflatable pockets 40 without the inflation of second set of inflatable pockets 42 (as shown in FIG. 2B). Likewise, inflation of second set of inflatable pockets 42 is possible without the inflation of first set of inflatable pockets 40. This configuration of first and second sets of inflations passages 40 and 42 allows for alternate or staggered inflation cycling as between first and second sets of inflations passages 40 and 42. The alternate inflation cycling provides reduced strain on carcass 32 of de-icer 30 as well as increases the aerodynamic characteristics of de-icer 30 by reducing susceptibility of airflow disruption across wing 12. During operation, de-icer 30 with alternating first and second sets of inflations passages 40 and 42 minimizes turbulence induced by the tubular shapes of first and second sets of inflations passages 40 and 42.

Figure 3A:
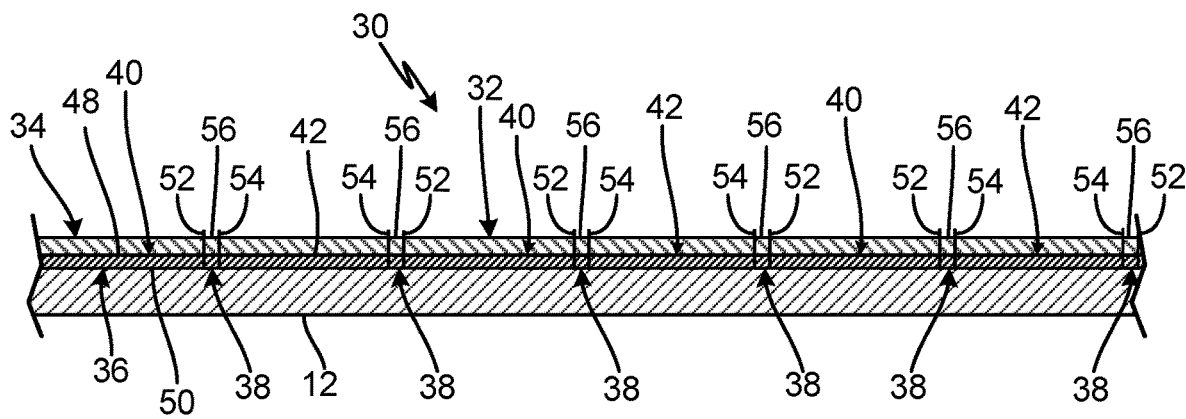
FIG. 3A is a sectional view taken along line 3A-3A of FIG. 2A of the pneumatic de-icer in a deflated state.
Figure 3B:
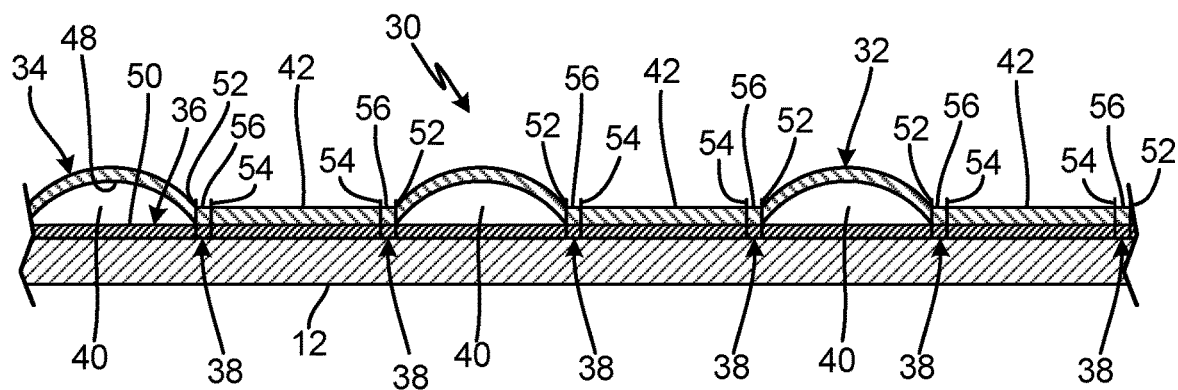
FIG. 3B is a sectional view taken along line 3B-3B of FIG. 2B of the pneumatic de-icer in a first inflation configuration.
Figure 3C:
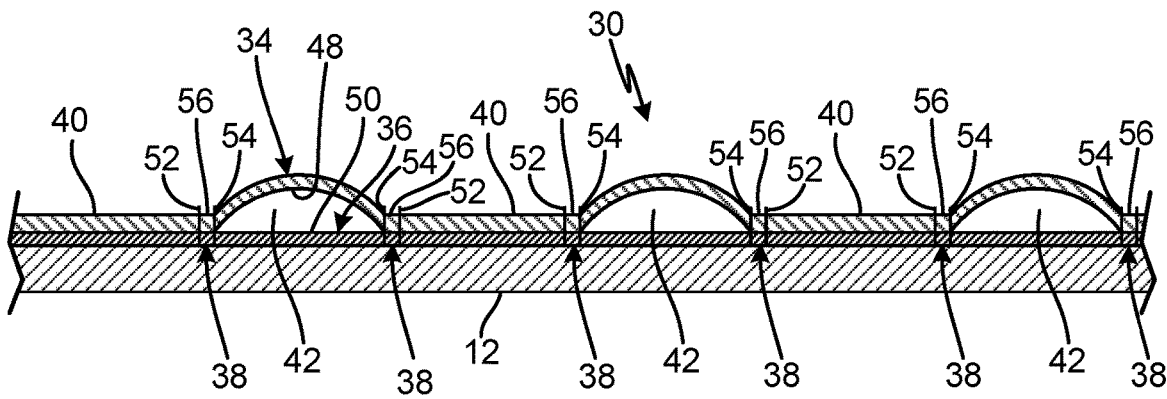
FIG. 3C is a sectional view taken along line 3C-3C of FIG. 2C of pneumatic de-icer in a second inflation configuration.

FIG. 3A is a sectional view taken along line 3A-3A of FIG. 2A of de-icer 30 in a deflation configuration. FIG. 3A shows wing 12 and de-icer 30, including carcass 32, first layer 34 (with first coating 48), second layer 36 (with second coating 50), seams 38 (with first stitchlines 52 and second stitchlines 54), first set of inflatable pockets 40 shown as deflated, second set of inflatable pockets 42 shown as deflated, and bonded regions 56. FIG. 3B is a sectional view taken along line 3B-3B of FIG. 2B of de-icer 30 in a first inflation configuration. FIG. 3B shows wing 12 and de-icer 30, including carcass 32, first layer 34 (with first coating 48), second layer 36 (with second coating 50), seams 38 (with first stitchlines 52 and second stitchlines 54), first set of inflatable pockets 40 shown as inflated, second set of inflatable pockets 42 shown as deflated, and bonded regions 56. FIG. 3C is a sectional view taken along line 3C-3C of FIG. 2C of de-icer 30 in a second inflation configuration with first set of inflatable pockets 40 shown as deflated and second set of inflatable pockets 42 shown as inflated. FIGS. 3B and 3C will be discussed together.

First coating 48 and second coating 50 are rubber or elastomer coatings. First stitchlines 52 and second stitchlines 54 are lines of loops of thread or threading. Bonded regions 56 are regions of carcass 32 where first layer 34 and second layer 36 are bonded together. In one non-limiting embodiment, bonded regions 56 include a plurality of cross-links between first coating 48 and second coating 50 created as a result of a vulcanizing process (or vulcanization). In other non-limiting embodiments, bonded regions 56 can include first layer 34 and second layer 36 being cured together.

First coating 48 is applied to and covers a side of first layer 34. In this non-limiting embodiment, first coating 48 covers a side of first layer 34 that is facing second layer 36. In other non-limiting embodiments, first layer 34 can include additional coatings on either side of first layer 34. Second coating 50 is applied to and covers a side of second layer 36. In this non-limiting embodiment, second coating 50 covers a side of second layer 36 that is facing first layer 34. In other non-limiting embodiments, second layer 36 can include additional coatings on either side of second layer 36.

First stitchlines 52 and second stitchlines 54 are sewn into and through first layer 34 and second layer 36. First stitchlines 52 and second stitchlines 54 are disposed on both sides of bonded region 56. Bonded regions 56 are formed by bonds created between first and second layers 34 and 36 of carcass 32. Bonded regions 56 are positioned between first and second stitchlines 52 and 54.

A method of making de-icer 30 includes bringing together first layer 34 and second layer 36 of carcass 32 such that first coating 48 on first layer 34 faces second coating 50 on second layer 36. Seams 38, each with first and second stitchlines 52 and 54, are sewn into carcass 32. Sewing seams 38 into carcass 32 includes forming first set of inflatable pockets 40 and second set of inflatable pockets 42 such that first set of inflatable pockets 40 and second set of inflatable pockets 42 are disposed between first and second layers 34 and 36 of carcass 32.

First coating 48 is bonded to second coating 50 such that bonded region 56 is formed between first and second stitchlines 52 and 54. Bonding first and second layers 34 and 36 of carcass 32 together includes creating a fluidic seal between first and second layers 34 and 36 of carcass 32. Bonding first and second layers 34 and 36 of carcass 32 together also includes vulcanizing first coating 48 of first layer 34 to second coating 50 of second layer 36.

Before first and second layers 34 and 36 are bonded, a piece of fabric can be inserted between first and second layers 34 and 36. The piece of fabric prevents first and second layers 34 and 36 from bonding at a location where the piece of fabric is located relative to first and second layers 34 and 36. Alternatively or additionally, at least one of a non-reactive chemical powder and a non-reactive chemical slurry can be applied to at least one of first and second layers 34 and 36 before first and second coatings 48 and 50 are bonded. The non-reactive chemical powder or slurry prevents first and second coatings 48 and 50 from bonding at a location where the powder or slurry is located relative to first and second layers 34 and 36. Also before first and second coatings 48 and 50 are bonded, a surface pattern can be imparted onto at least one of first and second coatings 48 and 50 with a tool. The surface pattern prevents first and second coatings 48 and 50 from bonding at a location where the surface pattern is located relative to first and second layers 34 and 36.

First coating 48 and second coating 50 function to enable bonding of first layer 34 to second layer 36 through a curing or vulcanizing process. Without first and second coatings 48 and 50 are positioned on the faces of first layer 34 and second layer 36 such that first and second coatings face each other, first layer 34 and second layer 36 could not be bonded together by a vulcanization process. First stitchlines 52 and second stitchlines 54 function to attach first and second layers 34 and 36 together. First stitchlines 52 and second stitchlines 54 also function to form boundaries or dividing lines along the edges of first and second sets of inflatable pockets 40 and 42. First stitchlines 52 define (are closest to) a boundaries of first inflatable pockets 40. Second stitchlines 54 (are closest to) boundaries of second inflatable pockets 42.

Bonded regions 56 function to prevent communication of a fluid (e.g., a gas such as air) across bonded regions 56. Bonded regions 56 seal a portion of first layer 34 including first coating 48 of carcass 32 to a portion of second layer 36 including second layer 50 of carcass 32. Bonded regions 56 enable first and second sets of inflatable pockets 40 and 42 to be separately inflatable from each other by forming a fluidic seal. The capacity of first and second sets of inflatable pockets 40 and 42 to separately inflate from each other is shown between FIGS. 3B and 3C.

As shown in FIG. 3B, first set of inflatable pockets 40 are inflated with a gas (such as air), while second set of inflatable pockets 42 are shown as deflated. As shown in FIG. 3C, first set of inflatable pockets 40 are deflated, while second set of inflatable pockets 42 are shown as inflated with a gas (such as air). The amounts and rates of both inflation and deflation are separately controlled for each of first and second sets of inflatable pockets 40 and 42 via first and second manifolds 44 and 46 (shown in FIGS. 2A-2C), respectively. As a pressure of the fluid within first manifold 44 increases, the pressure and amount of fluid within first set of inflatable pockets 40 also increases. As a pressure of the fluid within first manifold 44 decreases, the pressure and amount of fluid within first set of inflatable pockets 40 also decreases. Likewise, as a pressure of the fluid within second manifold 46 increases, the pressure and amount of fluid within second set of inflatable pockets 42 also increases. As a pressure of the fluid within second manifold 46 decreases, the pressure and amount of fluid within second set of inflatable pockets 42 also decreases. Also, because first and second sets of inflatable pockets 40 and 42 are separately inflatable, first set of inflatable pockets 40 can cycle through an inflation/deflation cycle while second set of inflatable pockets 42 occupies a set inflation point, and visa-versa.

The separate inflation and deflation of first and second sets of inflatable pockets 40 and 42 (i.e., alternate inflating tubes) of de-icer 30 reduces the amount of airflow disruption across wing 12 caused by de-icer 30. The separate inflation and deflation of first and second sets of inflatable pockets 40 and 42 also allows a longer fatigue life of de-icer 30 as compared to existing sewn de-icers without the capability of separately inflating sets of inflatable pockets. The fatigue life of de-icer 30 is increased due to the fact that when only one of either first set of inflatable pockets 40 or second set of inflatable pockets 42 is inflated, seams 38 experience approximately half of the strain seams 38 would experience if both first and second sets of inflatable pockets 40 and 42 were inflated.

Bonded regions 56 also reduce the amount of strain experienced by seams 38 because the bond created between first layer 34 and second layer 36 at bonded regions 56 absorb a portion of the strain caused by first and second layers 34 and 36 pulling apart from each other as first and/or second sets of inflation pockets 40 and 42 are inflated and deflated. Additionally, as compared to existing tube type de-icers with internal bladders used to create separate inflation tubes, de-icer 30 is easier to produce because de-icer 30 does not require multiple bladders inserted between first and second layers 34 and 36 in order to create the separate inflation sets. Bonded regions 56 create an air-tight, fluidic seal that effectively creates separate inflation tubes between de-icer 30 without the need of numerous inflatable bladders that add weight and manufacturing burdens as compared to existing de-icers.

Figure 4A:
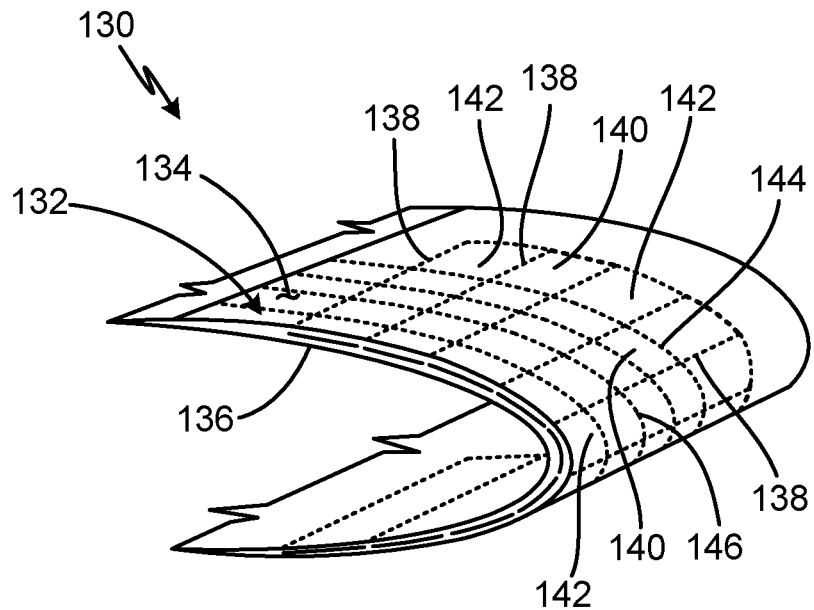
FIG. 4A is a perspective cut-away view of a span-wise pneumatic de-icer with deflated inflatable pockets which is attached to a leading edge of the wing of the aircraft.
Figure 4B:
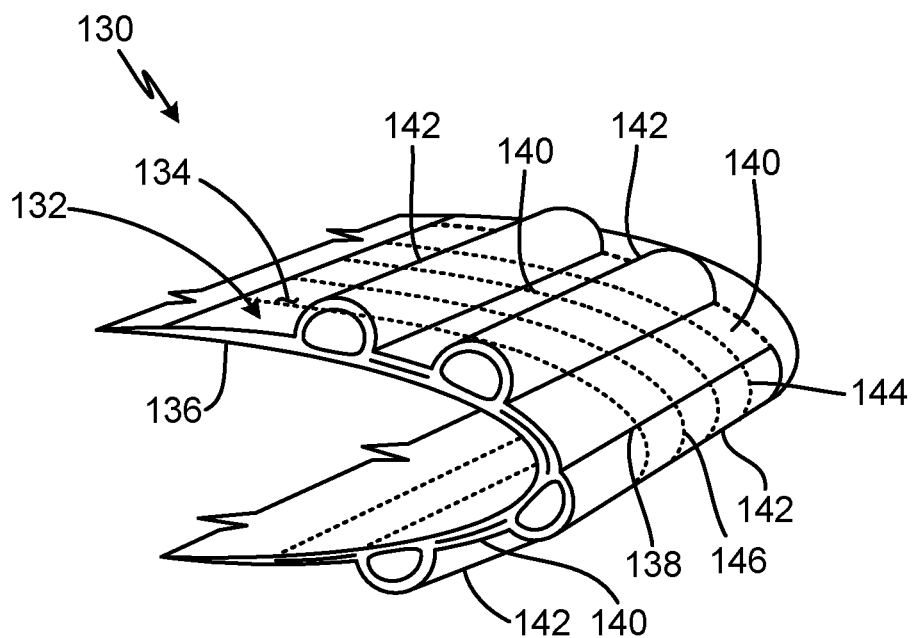
FIG. 4B is a perspective cut-away view of the span-wise pneumatic de-icer with a first set of inflatable pockets deflated and a second set of inflatable pockets inflated.

FIG. 4A is a perspective cut-away view of de-icer 130 in a deflated state which is attached to leading edge 18 of wing 12 of aircraft 10 (leading edge 18, wing 12, and aircraft 10 are not shown in FIGS. 4A and 4B). De-icer 130 includes carcass 132 (with first layer 134 and second layer 136), seams 138, first set of inflatable pockets 140, second set of inflatable pockets 142, and first manifold 144. FIG. 4B is a perspective cut-away view of de-icer 130 with first set of inflatable pockets 140 deflated and second set of inflatable pockets inflated 142.

De-icer 130 is a sewn pneumatic de-icer configured in a span-wise orientation relative to wing 12 of aircraft 10 (as compared to the chord-wise configuration discussed in FIGS. 2A-3C). De-icer 130 and each of its elements are connected and function together similar to de-icer 30 discussed with FIGS. 2A-3C. Depending on the location of the element onto which de-icer 130 (and de-icer 30) is mounted, a chord-wise sewn de-icer (e.g., de-icer 30) or a span-wise sewn de-icer (e.g., de-icer 130) may provide better aerodynamic effects (i.e., minimize turbulence across the airfoil surface), for example as between wing 12, vertical stabilizer 13, or horizontal stabilizers 14 of aircraft 10.

Discussion of Possible Embodiments

The following are non-exclusive descriptions of possible embodiments of the present invention.

A de-icing assembly for a surface of an aircraft includes a carcass with a first layer and a second layer, a plurality of seams sewn into the carcass, and a bonded region. The plurality of seams join the first and second layers of the carcass together. Each of the plurality of seams comprises two or more stitchlines. The bonded region is disposed between the two or more stitchlines and seals a portion of the first layer of the carcass to a portion of the second layer of the carcass.

The de-icing assembly of the preceding paragraph can optionally include, additionally and/or alternatively, any one or more of the following features, configurations and/or additional components.

A bonded region can prevent communication of a fluid across the bonded region.

A first set of inflatable pockets and/or a second set of inflatable pockets can be formed by the plurality of seams and/or disposed between the first and second layers of the carcass.

The first and second sets of inflatable pockets can be separately inflatable from each other.

A first manifold can be fluidly connected to the first set of inflatable pockets, wherein the first manifold can provide fluid to inflate the first set of inflatable pockets, and/or a second manifold can be fluidly connected to the second set of passages, wherein the second manifold can provide fluid to inflate the second set of inflatable pockets.

The first layer can include a first rubber coating, wherein the second layer can include a second rubber coating, wherein the first rubber coating can face towards the second rubber coating, wherein the second rubber coating can face towards the first rubber coating, and wherein a portion of the first rubber coating can be in contact with a portion of the second rubber coating at the bonded region.

The bonded region can comprise a vulcanized cross-link between the first and second rubber coatings.

The de-icing assembly can comprise a pneumatic de-icer.

The de-icing assembly can be configured to mount to at least one of a horizontal stabilizer of a wing, an upper surface of the wing, and/or a tail section of the aircraft.

A pneumatic de-icing assembly for an aircraft includes an array of pneumatically inflatable pockets and a seam between adjacent pockets. The array of pneumatically inflatable pockets are arranged in a side-by-side configuration. The seam includes a set of parallel stitchlines and a bond extending parallel to and positioned between the stitchlines. The seam separates and seals between the adjacent pockets so that the adjacent pockets are separably inflatable and deflatable.

The pneumatic de-icing assembly of the preceding paragraph can optionally include, additionally and/or alternatively, any one or more of the following features, configurations and/or additional components.

A carcass can have a first layer and a second layer, wherein the array of pneumatically inflatable pockets can be disposed between the first and second layer of the carcass.

A first set of inflatable pockets and/or a second set of inflatable pockets can be formed by the seam, wherein the first and/or second sets of inflatable pockets can be separately inflatable from each other.

The first layer can include a first rubber coating, wherein the second layer can include a second rubber coating, wherein the first rubber coating can face towards the second rubber coating, wherein the second rubber coating can face towards the first rubber coating, wherein a portion of the first rubber coating can be in contact with a portion of the second rubber coating at the bond, and wherein the bond can comprise a vulcanized cross-link between the first and second rubber coatings.

A method of making a de-icer includes bringing together a first layer of a carcass and a second layer of the carcass such that a first rubber coating on the first layer faces a second rubber coating on the second layer. A plurality of seams, each with two or more stitchlines, are sewn into the carcass. The first layer is bonded to the second layer such that a bond is formed between the two or more stitchlines.

The method of the preceding paragraph can optionally include, additionally and/or alternatively, any one or more of the following steps, features, configurations and/or additional components.

A fluidic seal can be created between the first and second layers of the carcass.

The first rubber coating of the first layer can be vulcanized to the second rubber coating of the second layer.

A first set of inflatable pockets and a second set of inflatable pockets can be formed, wherein the first set of inflatable pockets and/or the second set of inflatable pockets can be disposed between the first and second layers of the carcass.

A piece of fabric can be inserted between the first and second layers before the first and second layers are bonded, wherein the piece of fabric can prevent the first and second layers from bonding at a location where the piece of fabric is located relative to the first and second layers.

At least one of a non-reactive chemical powder and a non-reactive chemical slurry can be applied to at least one of the first and second layers before the first and second layers are bonded, wherein the at least one of the non-reactive chemical powder and the non-reactive chemical slurry can prevent the first and second layers from bonding at a location where the at least one of the non-reactive chemical powder and the non-reactive chemical slurry is located relative to the first and second layers.

A surface pattern can be imparted onto at least one of the first and second layers with a tool before the first and second layers are bonded, wherein the surface pattern can prevent the first and second layers from bonding at a location where the surface pattern is located relative to the first and second layers.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A de-icing assembly for a surface of an aircraft, the de-icing assembly comprising:
   a carcass with a first layer and a second layer;
   a plurality of seams sewn into the carcass, wherein the plurality of seams joins the first and second layers of the carcass together, wherein each of the plurality of seams comprises two or more stitchlines;
   a bonded region disposed between the two or more stitchlines of the plurality of seams, wherein the bonded region seals a portion of the first layer of the carcass to a portion of the second layer of the carcass; and
   first and second sets of inflatable pockets each defined by the plurality of seams and by the bonded region, wherein the first set of inflatable pockets and the second set of inflatable pockets are disposed between the first and second layers of the carcass.

2. The de-icing assembly of claim 1, wherein the bonded region prevents communication of a fluid across the bonded region.

3. The de-icing assembly of claim 1, wherein the first and second sets of inflatable pockets are separately inflatable from each other.

4. The de-icing assembly of claim 1, further comprising:
   a first manifold fluidly connected to the first set of inflatable pockets, wherein the first manifold provides fluid to inflate the first set of inflatable pockets; and
   a second manifold fluidly connected to the second set of passages, wherein the second manifold provides fluid to inflate the second set of inflatable pockets.

5. The de-icing assembly of claim 1, wherein the first layer includes a first rubber coating, wherein the second layer includes a second rubber coating, wherein the first rubber coating faces towards the second rubber coating, wherein the second rubber coating faces towards the first rubber coating, and wherein a portion of the first rubber coating is in contact with a portion of the second rubber coating at the bonded region.

6. The de-icing assembly of claim 5, wherein the bonded region comprises a vulcanized cross-link between the first and second rubber coatings.

7. The de-icing assembly of claim 1, wherein the de-icing assembly comprises a pneumatic de-icer.

8. The de-icing assembly of claim 1, wherein the de-icing assembly is configured to mount to at least one of a horizontal stabilizer of a wing, an upper surface of the wing, and a tail section of the aircraft.

9. A pneumatic de-icing assembly for an aircraft, the pneumatic de-icing assembly the comprising:
an array of pneumatically inflatable pockets arranged in a side-by-side configuration; and
a seam between adjacent pockets, the seam including a set of parallel stitchlines and a bond extending parallel to and positioned between the stitchlines, wherein the pneumatically inflatable pockets are formed by the bond and by the parallel stitchlines, the seam separating and sealing between the adjacent pockets so that the adjacent pockets are separably inflatable and deflatable.

10. The pneumatic de-icing assembly of claim 9, further comprising:
a carcass with a first layer and a second layer, wherein the array of pneumatically inflatable pockets is disposed between the first and second layer of the carcass.

11. The pneumatic de-icing assembly of claim 10, wherein the array of pneumatically inflatable pockets comprises a first set of inflatable pockets and a second set of inflatable pockets, wherein the first and second sets of inflatable pockets are formed by the seam, wherein the first and second sets of inflatable pockets are separately inflatable from each other.

12. The pneumatic de-icing assembly of claim 10, wherein the first layer includes a first rubber coating, wherein the second layer includes a second rubber coating, wherein the first rubber coating faces towards the second rubber coating, wherein the second rubber coating faces towards the first rubber coating, wherein a portion of the first rubber coating is in contact with a portion of the second rubber coating at the bond, and wherein the bond comprises a vulcanized cross-link between the first and second rubber coatings.

13. A method of making a de-icer, the method comprising:
bringing together a first layer of a carcass and a second layer of the carcass such that a first rubber coating on the first layer faces a second rubber coating on the second layer;
sewing a plurality of seams into the carcass, wherein each of the plurality of seams comprises two or more stitchlines, wherein sewing a plurality of seams into the carcass comprises forming a first set of inflatable pockets and a second set of inflatable pockets, wherein the first set of inflatable pockets and the second set of inflatable pockets are disposed between the first and second layers of the carcass; and
bonding the first layer to the second layer, wherein a bond is formed between the stitchlines, wherein the inflatable pockets are formed by the bond and by the stitchlines.

14. The method of claim 13, wherein bonding the first and second layers of the carcass together comprises creating a fluidic seal between the first and second layers of the carcass.

15. The method of claim 13, wherein bonding the first and second layers of the carcass together comprises vulcanizing the first rubber coating of the first layer to the second rubber coating of the second layer.

16. The method of claim 13, further comprising inserting a piece of fabric between the first and second layers before the first and second layers are bonded, wherein the piece of fabric prevents the first and second layers from bonding at a location where the piece of fabric is located relative to the first and second layers.

17. The method of claim 13, further comprising applying at least one of a non-reactive chemical powder and a non-reactive chemical slurry to at least one of the first and second layers before the first and second layers are bonded, wherein the at least one of the non-reactive chemical powder and the non-reactive chemical slurry prevents the first and second layers from bonding at a location where the at least one of the non-reactive chemical powder and the non-reactive chemical slurry is located relative to the first and second layers.

18. The method of claim 13, further comprising imparting a surface pattern onto at least one of the first and second layers with a tool before the first and second layers are bonded, wherein the surface pattern prevents the first and second layers from bonding at a location where the surface pattern is located relative to the first and second layers.

* * * * *